July 17, 1923.

F. PARMENTIER

WATER TURBINE CONSTRUCTION

Filed Sept. 2, 1922

Witnesses:
J. L. Fox
N. Berman

Inventor
F. Parmentier
By Clarence A. O'Brien
Attorney

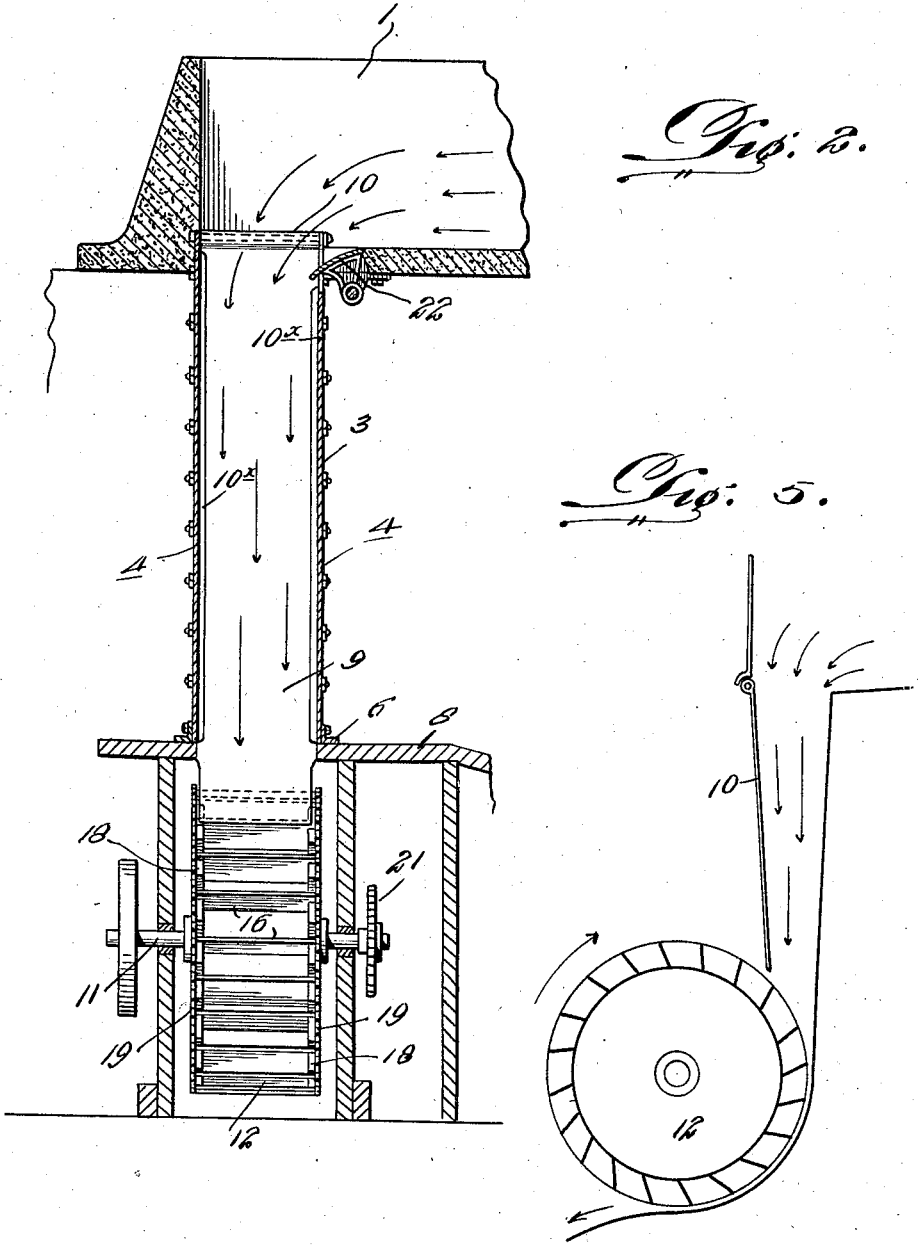

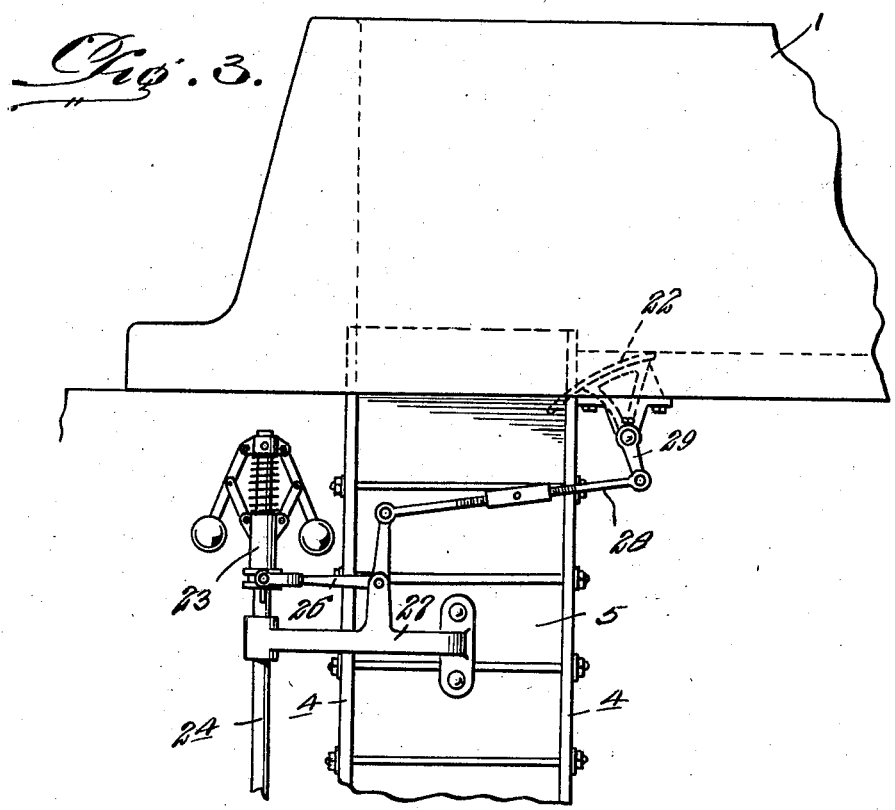
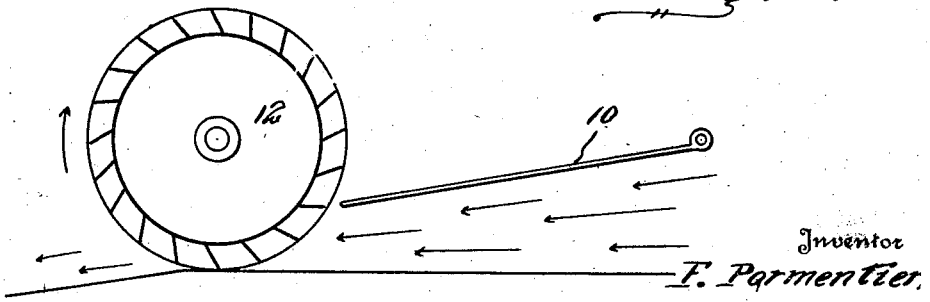

July 17, 1923.
F. PARMENTIER
WATER TURBINE CONSTRUCTION
Filed Sept. 2, 1922
1,462,070
4 Sheets-Sheet 4
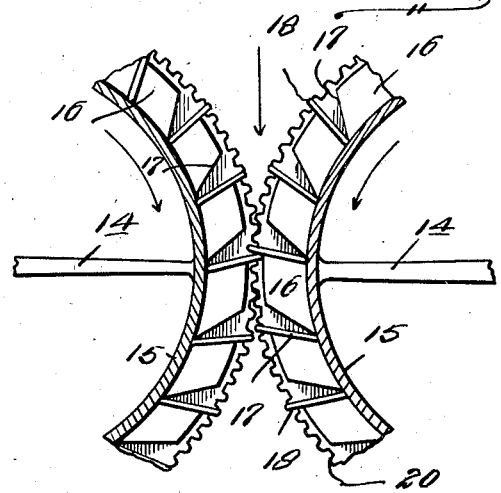
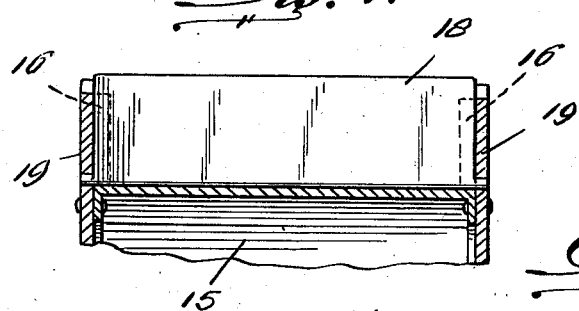
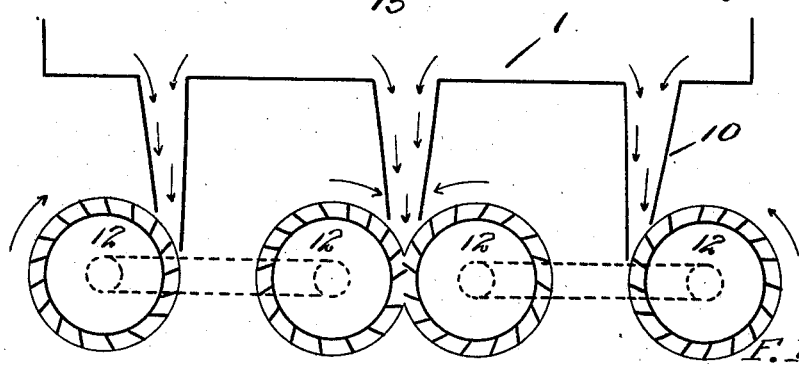

Patented July 17, 1923.

1,462,070

UNITED STATES PATENT OFFICE.

FRANK PARMENTIER, OF PHILADELPHIA, PENNSYLVANIA.

WATER-TURBINE CONSTRUCTION.

Application filed September 2, 1922. Serial No. 585,875.

*To all whom it may concern:*

Be it known that I, FRANK PARMENTIER, a citizen of the United States, residing at Philadelphia, in the county of Philadelphia and State of Pennsylvania, have invented new and useful Improvements in Water-Turbine Constructions, of which the following is a specification.

In carrying out the present invention it is my purpose to provide a water turbine construction wherein the flow of water to the wheels may be regulated at will so that the turbine may be operated at the desired speed, and wherein the flow of water to the wheels may be regulated automatically by the turbine itself so that in the event of an increase or decrease in the load open on turbine a volume of water flow into the wheels will be regulated accordingly thereby enabling the wheels to rotate at a uniform speed regardless of the load.

It is also my purpose to provide a water turbine which will embrace the desired features of simplicity, efficiency and durability which will operate effectively under all conditions and wherein the component parts will be so arranged and co-related as to reduce the possibility of derangement to a minimum.

With the above recited objects in view and others of similar nature the invention resides in the construction, combination and arrangement of parts hereinafter set forth in and falling within the scope of the appended claims.

In the accompanying drawings:—

Figure 2 is a vertical section on the line 2—2 of Figure 1.

Figure 3 is an enlarged fragmentary elevation showing the governor mechanism.

Figure 4 is a fragmentary sectional view showing the intermeshing water wheels.

Figure 5 is a diagrammatic view showing a modified form of the invention.

Figure 6 is a similar view showing a further modification.

Figure 7 is a sectional view on the line 7—7 of Figure 1.

Figure 8 is a diagrammatic view showing a further modified form of the invention.

Figure 1:
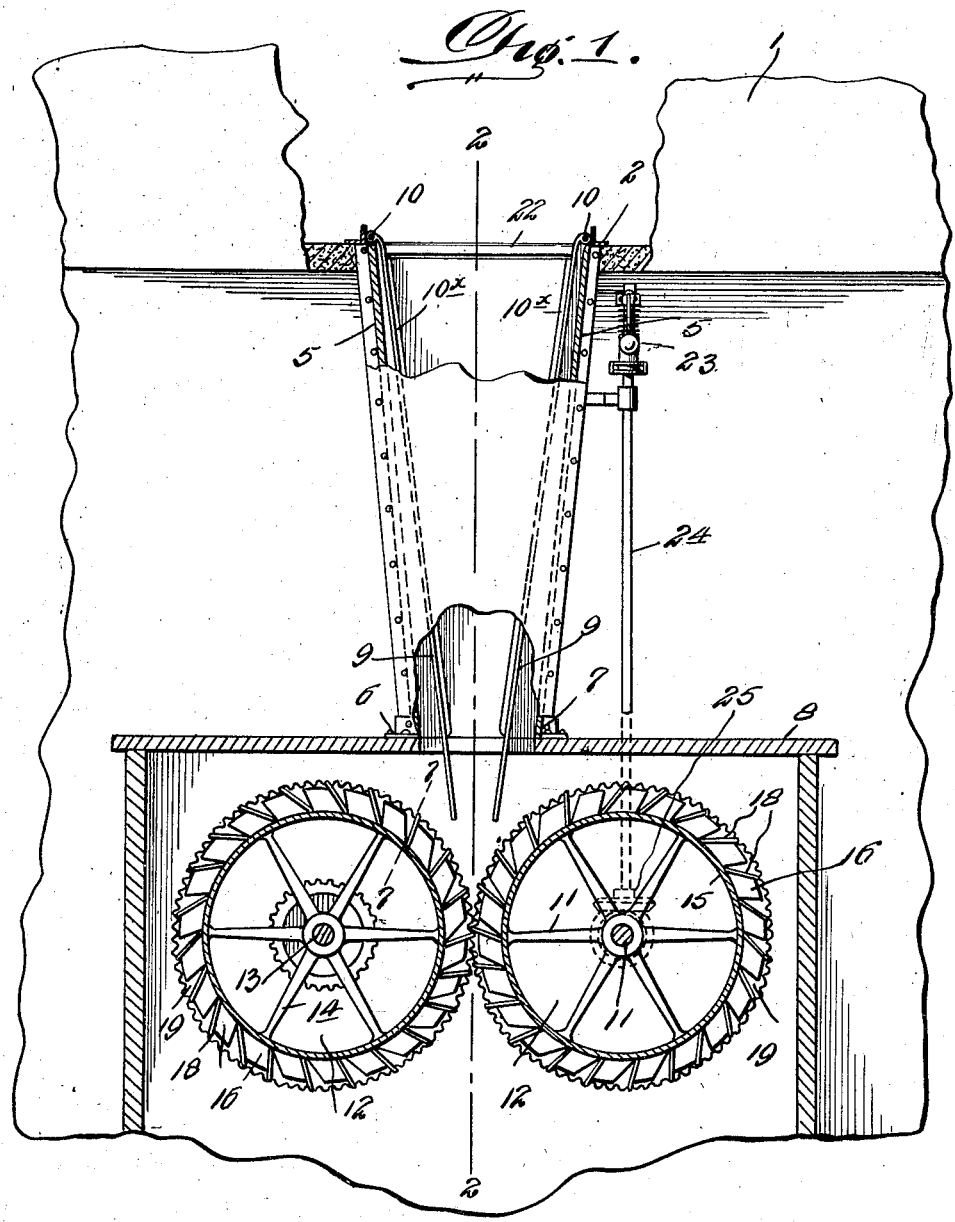
Figure 1 is a view partly in side elevation and partly in section of a water turbine constructed in accordance with my invention.

Referring to the drawings in detail and more particularly to the construction of my invention shown in Figures 1, 2, 3, 4 and 7 of the drawings, 1 designates an overhead dam or basin provided in its bottom with an outlet 2. Secured to the bottom of the basin within the outlet 2 is the upper end of a caisson or water tube 3, which in the present instance comprises vertical side walls 4, 4 and end walls 5, 5 converging toward each other at their lower ends so as to provide a restricted outlet of the water. The lower end of the caisson is connected as at 6 with an inlet opening 7 formed in the upper end of a housing 8 of suitable construction. Within the caisson 5 and lying alongside of the end walls 5, 5 are vanes 9, 9, respectively. These vanes are pivotally connected at their upper ends as at 10 with the top of the caisson immediately above the respective end walls 5, 5 while the lower ends of the vanes extend into the housing 8 a short distance through the inlet opening 7. The side edges of each vane 9 are equipped with flanges 10× that bear against the side walls 4, 4 so as to form fluid tight joints between the vanes and the side walls, thereby enabling the water to be directed downwardly between the vanes 9, 9 so that the velocity of the water passing through the caisson may be increased as it leaves the lower ends of the vanes. These flanges 10×, 10× frictionally engaging the side walls of the caisson are held in preadjusted positions thereby, so that during the installation of the device, the vanes may be adjusted as desired for regulating the size of the discharge opening. These vanes are held in positive adjusted positions through the medium of side walls of the caisson and may be subsequently adjusted by the disassembling of said caisson.

Journaled in the side walls of the housing 8 and arranged at opposite sides of the vertical center line of the caisson are shafts 11, 11 upon which are fixed respectively water wheels 12, 12. In the present instance each water wheel 12 comprises a hub 13 from which radiates spokes 14. On the outer ends of the spokes 14 is an annulus 15 and on the outer side of the annulus 15 are blocks 16 spaced apart around the annulus at equal distances. The confronting faces of the blocks 16 are cut on diverging angles 17 as clearly shown in Figure 4 of the drawings and mounted between the confronting face of the blocks are vanes 18 pivoted at their inner ends to the annulus 15. Connected to the side edges of each annulus 15 and extending outwardly from such annulus are rings 19 having their outer edges formed with teeth 20. The teeth 20 of the rings on one wheel mesh with the teeth of the rings of the other wheel as clearly shown in Figures 1 and 4 of the drawings thereby enabling the wheels to rotate in unison. The inner faces of the rings 19 and the confronting faces of the blocks 16 together with the vanes 18 constitute buckets which at the point of contact of the teeth 20 of the water wheels are open so as to receive the impact of the water directed into such buckets by the vanes 9, 9. It will be seen upon inspection of Figures 1 and 4 of the drawings that the vanes 18 swing to bucket forming positions as they approach the stream of water issuing from the caisson while such vanes 18 swing to inactive or non-bucket forming position as they leave the influence or zone of the water issuing from the caisson thus effectively cleansing the buckets so as to take the full volume of the water when they next enter the zone of the water issuing from the caisson.

One of the shafts 11 is equipped with a gear wheel 21 by means of which power may be taken from the turbine. It is conceivable, of course, that any other form of power transmitting mechanism may be employed.

The turbine is automatically governed so that any increase or decrease in the load on the turbine will be automatically taken care of and in the present instance the automatic control comprises a spill gate 22 that is pivoted in the bottom wall of the basin 1 immediately behind the caisson 3. This gate 22 normally closes an opening contiguous to the caisson and is adapted to be moved to open position so that a portion of the water will be directed from the basin outwardly of the caisson. In order to so move the gate 22 I employ a governor 23 of any suitable construction but which in this instance is of the centrifugal ball type. This governor is mounted at the upper end of the shaft 24 the lower end of which is carried to one of the shafts 11 as at 25. The sliding collar of the governor 23 is connected to one arm of a bell crank lever 26 that is pivoted at its bight upon a bracket 27 carried by the caisson. The other end of the bell crank lever 26 is connected through an adjustable length 28 with an arm 29 provided on the gate 22. Thus as the speed of the wheels increases or decreases the governor operates to open or close, as the case may be, the gate 22 thus varying the quantity of water flowing through the caisson.

In the modified forms of my invention shown in Figures 5, 6 and 8 of the drawings I have shown a single vane 10 in each instance, and in Figure 5 the movable vane controls the vertical flow of water of a single wheel, while at Figure 6 the single vane controls the horizontal flow of water of a single wheel. In Figure 8 I have shown the wheels and vanes 10* in battery formation, four wheels being employed, thereby greatly increasing the power.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. In water turbine construction, the combination with a water containing basin having a discharge opening at its lower end, of a caisson depending from said basin and connected thereto at the discharge opening thereof, intermeshing water wheels below said caisson having their points contact in line with the center of said caisson, and adjustable vanes in said caisson for directing the water on to said water wheels at the point of contact thereof.

2. In water turbine construction, the combination with a water containing basin having a discharge opening at its lower end, of a caisson depending from said basin and connected thereto at the discharge opening thereof, intermeshing water wheels below said caisson having their points contact in line with the center of said caisson, and adjustable vanes in said caisson for directing the water on to said water wheels at the point of contact, and means carried by said vanes and frictionally engaging the walls of said caisson to form fluid tight joints and hold said vanes in adjusted positions.

3. In water turbine construction, the combination with a water containing basin having a discharge opening at its lower end, of a caisson depending from said basin and connected thereto at the discharge opening thereof, intermeshing water wheels below said caisson having their points contact in line with the center of said caisson, and adjustable vanes in said caisson for directing water on to said water wheels at the point of contact, a gate in the bottom of said basin for deflecting the water from said caisson, and means controlling said gate and under the control of said water wheels.

4. In water turbine construction, the combination with a water containing basin having a discharge opening at its lower end, of a caisson depending from said basin and connected thereto at the discharge opening thereof, intermeshing water wheels below said caisson having their points contact in line with the center of said caisson, and adjustable vanes in said caisson for directing the water on to said water wheels at the point of contact thereof; each water wheel comprising a hub, spokes rotating from said hub, an annulus on the outer ends of said spokes, blocks on the outer surface of said annulus spaced apart at equal distances, and vanes within said spaces, respectively.

5. In water turbine construction, the combination with a water containing basin having a discharge opening at its lower end, of a caisson depending from said basin and connected thereto at the discharge opening thereof, intermeshing water wheels below said caisson having their points contact in line with the center of said caisson, and adjustable vanes in said caisson for directing the water on to said water wheels at the point of contact thereof; each water wheel comprising a hub, spokes rotating from said hub, an annulus on the outer ends of said spokes, blocks on the outer surface of said annulus spaced apart at equal distances, and vanes within said spaces, respectively, and gear rings carried by the side edges of said annulus and meshing with the gear rings of the other wheel and cooperating with said blocks and vanes to form buckets.

6. In water turbine construction, the combination with a water wheel of a vane for directing the flow of water onto said water wheel, said vane being mounted for swinging movement, whereby the discharge opening formed by the vane may be varied.

In testimony whereof, I affix my signature.

FRANK PARMENTIER.